(12) United States Patent
Ramany et al.

(10) Patent No.: US 7,844,701 B2
(45) Date of Patent: Nov. 30, 2010

(54) RULE-BASED PERFORMANCE ANALYSIS OF STORAGE APPLIANCES

(75) Inventors: Swami Ramany, Sunnyvale, CA (US); Brian Hackworth, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 826 days.

(21) Appl. No.: 11/194,253

(22) Filed: Aug. 1, 2005

(65) Prior Publication Data

US 2007/0027985 A1 Feb. 1, 2007

(51) Int. Cl.
*G06F 15/173* (2006.01)
*G06F 13/00* (2006.01)

(52) U.S. Cl. ........................ 709/224; 711/117
(58) Field of Classification Search .............. 709/224; 711/117
See application file for complete search history.

(56) References Cited

U.S. PATENT DOCUMENTS

| | | | |
|---|---|---|---|
| 4,849,879 A | 7/1989 | Chinnaswamy et al. ..... 364/200 |
| 5,568,629 A | 10/1996 | Gentry et al. | |
| 5,889,934 A | 3/1999 | Peterson | |
| 7,127,577 B2 | 10/2006 | Koning et al. | |
| 7,159,081 B2 * | 1/2007 | Suzuki ........................ 711/154 |
| 7,216,263 B2 * | 5/2007 | Takaoka et al. ............... 714/47 |
| 7,237,021 B2 * | 6/2007 | Penny et al. ................ 709/223 |
| 7,275,103 B1 * | 9/2007 | Thrasher et al. ............. 709/224 |
| 7,343,524 B2 * | 3/2008 | Klotz et al. .................... 714/39 |
| 7,389,341 B2 * | 6/2008 | Cornelius et al. ........... 709/224 |
| 7,403,987 B1 * | 7/2008 | Marinelli et al. ............ 709/223 |
| 7,506,040 B1 * | 3/2009 | Rabe et al. ................... 709/223 |
| 7,562,250 B2 * | 7/2009 | Wahl et al. ....................... 714/6 |
| 2002/0103900 A1 * | 8/2002 | Cornelius et al. ........... 709/224 |
| 2003/0229890 A1 * | 12/2003 | Lau et al. ..................... 717/168 |
| 2004/0243699 A1 * | 12/2004 | Koclanes et al. ............ 709/224 |
| 2004/0249920 A1 * | 12/2004 | Ogasawara et al. ......... 709/223 |
| 2005/0015658 A1 * | 1/2005 | Zohar et al. ................... 714/10 |
| 2005/0193167 A1 * | 9/2005 | Eguchi et al. ............... 711/114 |
| 2006/0053261 A1 * | 3/2006 | Prahlad et al. .............. 711/162 |
| 2006/0053263 A1 * | 3/2006 | Prahlad et al. .............. 711/162 |

(Continued)

OTHER PUBLICATIONS

Computer Associates International, Inc., Unicenter® Performance Management for OpenVMS, ca.com 2002.

(Continued)

*Primary Examiner*—William C Vaughn, Jr.
*Assistant Examiner*—Muktesh G Gupta
(74) *Attorney, Agent, or Firm*—Blakely, Sokoloff, Taylor & Zafman LLP

(57) ABSTRACT

A rule-based performance analysis tool and a method analyze metrics from a network storage system and generate recommendations for resolving actual or anticipated performance problems. The tool and method collect system metrics from one or more sources, including a storage appliance and optional user-reported comments and/or information about proposed changes to the network storage system. A rule base is applied against the collected metrics and user inputs. Each rule is associated with one or more metrics and has one or more threshold values. A rule can analyze a rate of change of a metric. For each triggered rule, the tool provides an output that includes an explanation of the rule, a suggested action to alleviate or avoid the problem that triggered the rule and, optionally, a priority level. The outputs are presented in a hierarchical display.

20 Claims, 7 Drawing Sheets

U.S. PATENT DOCUMENTS

2006/0265497 A1* 11/2006 Ohata et al. ................ 709/224
2007/0067435 A1* 3/2007 Landis et al. ............... 709/224
2008/0059704 A1* 3/2008 Kavuri ....................... 711/117

OTHER PUBLICATIONS

Q Associates, Storage Area Networking (SAN)—Veritas Products, http://www.sun.qassociates.co.uk/storage-storage-area-networks-products.htm pp. 1-9 2004.
Veritas Volume Manager for Windows 2000, Advanced Storage Management Technology for the Windows 2000 Platform pp. 1-4, 2002.
Builder.com, ReadyHosting.com, http://builder.com.com/5102-6388.5219086.html pp. 1-2, May 2004.
Veritas Press Releases 1998 http://www.veritas.com/us/aboutus/pressroom/1998/98-05-05-1.html pp. 1-5 (1998).
NetApp Support Edge Services, Delivering Unprecedented Flexibility for the Global Enterprise, www.netap.com pp. 1-2, 2004.
Chudnow, New Remedy for Storage Headaches: Meta-Policies Ease the Pain, http://www.findarticles.com/p/articles/mi_M0BRZ/is_9_22/ai_101679014/print, Sep. 2002.
White, Database Associates, The Benefits of Network Storage for DB2 Data Warehousing, pp. 1-18 Version 1:2002.

* cited by examiner

RULE-BASED PERFORMANCE ANALYSIS OF STORAGE APPLIANCES

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to performance analysis of network computer storage systems and, more particularly, to rule-based analysis of metrics gathered from such systems and generation of recommendations for resolving actual or anticipated performance problems.

Computer workstations and application servers (collectively hereinafter referred to as "clients") frequently access data that is stored remotely from the clients. In these cases, computer networks are used to connect the clients to storage devices (such as disks) that store the data. For example, Information Systems (IS) departments frequently maintain "disk farms," tape backup facilities and optical and other storage devices (sometimes referred to as media) in one or more central locations and provide access to these storage devices via computer networks. This centralized storage (commonly referred to as "network storage") enables data stored on the storage devices to be shared by many clients scattered throughout an organization. Centralized network storage also enables the IS departments to store the data on highly reliable (sometimes redundant) equipment, so the data remains available, even in case of a catastrophic failure of one or more of the storage devices. Centralized data storage also facilitates making frequent backup copies of the data and providing access to backed-up data, when necessary.

Specialized computers (variously referred to as file servers, storage servers, filers, etc., collectively hereinafter referred to as "storage appliances") located in the central locations make the data on the storage devices available to the clients. Software in the storage appliances and other software in the clients cooperate to make the central storage devices appear to users and application programs as though the storage devices are locally connected to the clients.

In addition, the storage appliances can perform services that are not visible to the clients. For example, a storage appliance can present a logical "volume" to clients and implement the volume across a set of physical disks. That is, the appliance satisfies write and read requests issued by the clients to the logical volume by writing to, or reading from, one or more of the physical disks of the set. Spreading the contents of the volume across the set of physical disks (commonly referred to as "striping") improves throughput by dividing the input/output (I/O) workload among the physical disks of the set. Thus, some I/O operations can be performed on one physical disks while other I/O operations are performed on other physical disks. Furthermore, a logical volume can provide more storage capacity than a single physical disk, and that capacity can be dynamically increased by adding physical disks to the logical volume.

In another example, a storage appliance can redundantly store data on a set of storage devices, such as on a Redundant Array of Inexpensive (or Independent) Disks (RAID). If one member of the RAID fails, the storage appliance uses the remaining members of the RAID to continue satisfying read and write commands from the clients until (optionally) the failed RAID member is replaced.

In some cases, storage devices are directly connected to storage appliances. Such directly attached storage devices are sometimes referred to as Network Attached Storage (NAS). In other cases, storage devices are connected to storage appliances via dedicated, high-performance networks, commonly referred to as Storage Area Networks (SANs). Clients can be connected to storage appliances via local area networks (LANs), wide area networks (WANs) or a combination of LANs and WANs.

Maintaining a high level of performance (such as fast response time and/or high throughput) of storage appliances and their related storage devices can be challenging, especially with the constantly increasing amount of data IS departments are called on to store and to make available to their respective clients. This challenge is increased by ever changing workloads placed on the storage appliances and storage devices as a result of shifting business priorities within user communities. Manually collecting and analyzing system and performance metrics from storage appliances is time-consuming and yields results of varying quality, depending, among other things, on the experience level of the person performing the analysis. Furthermore, when databases are moved within network storage systems, or the software in storage appliances is upgraded to newer versions or new features are added, these systems often suffer performance degradations. These performance problems are sometimes caused by "bottlenecks" created by the moves. Other times, the problems result from increased workloads the changes place on processors, memory or other resources in the storage appliances. Thus, analyzing system and performance metrics of network storage components and determining appropriate actions that can be taken to correct performance problems are difficult tasks. Furthermore, predicting the performance impact of proposed changes to a network storage system is particularly challenging.

BRIEF SUMMARY OF THE INVENTION

Disclosed is a rule-based performance analysis tool and method for analyzing metrics from a network storage system and generating recommendations for resolving actual or anticipated performance problems. The performance analysis tool collects system metrics from one or more sources, such as storage appliances, client computers, storage devices, network elements (such as switches) that interconnect the clients with the storage appliances and network elements that interconnect the storage appliances with storage devices. The performance analysis tool optionally also accepts an indication from a user of the user's perception of system performance, such as slow or no response while attempting to access a database or a file. "User" herein means a human who interacts with the system or with a portion thereof. In some situations, which are clear from their contexts, "user" means a system administrator.

The performance analysis tool includes a data collector that executes on the storage appliances. The data collector collects data and stores it (at least temporarily) on the storage appliance. Optionally, the data collector stores certain metrics only if these or other metrics exceed predetermined thresholds, thereby reducing metric storage requirements during periods of little or no activity on the storage appliances.

The performance analysis tool applies a rule base against the collected metrics and the optional user indication (collectively hereinafter referred to as metrics). Each rule is associated with one or more of the metrics. For each associated metric, the rule specifies a value (threshold) and a relationship (such as "is less than," "equals" or "exceeds") to the threshold. For each rule that "fires," i.e., for each rule whose measured metric(s) has(have) the specified relationship(s) to the threshold(s), the tool provides an output that includes: an indication of the importance of the rule, a suggested action to alleviate the problem that caused the rule to fire and an optional explanation of the rule. The importance of the rule can indicate the likelihood that the rule detected a true problem or that implementing the suggested action will alleviate the problem (collectively referred to herein as a "confidence level" or "priority").

In another mode of operation, information about a proposed change to the network storage system is entered and forms part of the metrics. For example, the proposed change can be: installing a new version of software in the storage appliance; installing an additional storage device; or relocating files or databases within the network storage system. The performance analysis tool applies the rule base to the metrics. In this mode of operation, the rules can fire in response to the proposed change to detect performance problems that might occur as a result of the change and suggest actions that can be taken in anticipation of the proposed change. Thus, action can be taken before the proposed change is made, and the anticipated performance problems can be avoided. Alternatively, the proposed change can be foregone to avoid the anticipated performance problems.

In yet another mode of operation, the rules detect rates at which certain metrics change, so as to predict when resources, such as disk storage space, will reach critical levels or become exhausted. If one or more of these rates exceed predetermined thresholds, the rules fire.

Optionally, the metrics can be collected at one or more remote locations and automatically periodically sent to a central location for storage and analysis. For example, the metrics can be collected by data collectors being executed on storage appliances that are installed at customers' sites, and the data can be stored and analyzed at a central location by a vendor that supplied the storage appliances or by a third-party service bureau.

The results of analysis, i.e., information about rules that have fired, are presented in a hierarchical display. Each node of the hierarchy represents a group of related rules. Outputs from the groups of related rules are displayed below their respective nodes in the hierarchy. A user can individually expand or collapse each node of the hierarchy to obtain more for less information about the rules that have fired.

These and other features, advantages, aspects and embodiments of the present invention will become more apparent to those skilled in the art from the Detailed Description Of The Invention that follows.

BRIEF DESCRIPTION OF THE SEVERAL VIEWS OF THE DRAWINGS

The invention will be more fully understood by referring to the Detailed Description Of The Invention in conjunction with the Drawings, of which.

DETAILED DESCRIPTION OF THE INVENTION

A rule-based performance analysis tool and method for analyzing metrics from a network storage system and generating recommendations for resolving actual or anticipated performance problems is disclosed. The performance analysis tool collects system metrics from one or more sources, including optional user-reported comments and/or information about proposed changes to the network storage system. The performance analysis tool applies a rule base against the collected metrics. Each rule has one or more threshold values. Optionally, some rules analyze trends in resource utilization to anticipate when resources will become critical or exhausted. For each rule that fires, the tool provides an output that includes a suggested action to alleviate or avoid the problem that caused the rule to be triggered, a priority and an optional explanation of the rule.

Figure 1:
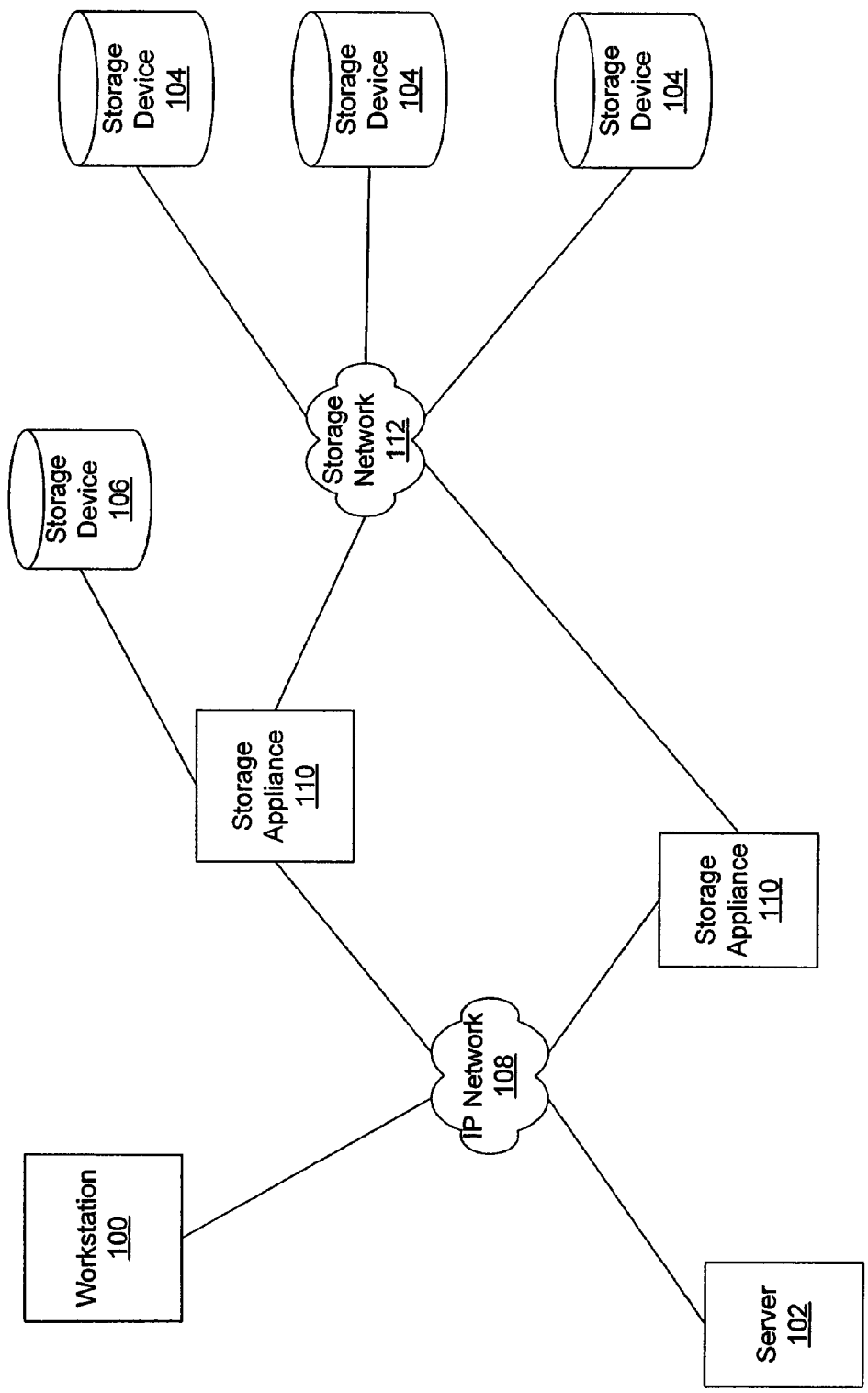
FIG. 1 is a block diagram of an exemplary network storage system, in which the presently disclosed performance analysis tool and method can be used.

As noted, workstations and application servers (collectively "clients") are frequently connected to storage appliances and/or storage devices via local or wide area networks (LANs or WANs) and/or storage networks. FIG. 1 is a block diagram of an exemplary network storage system in which the presently disclosed performance analysis tool and method can be used. Workstation 100 and application server 102 (collectively "clients") are connected to storage devices 104 and 106 via a packet-switched (such as in Internet Protocol (IP)) network 108 and two storage appliances 110. Other numbers of workstations 100, servers 102, storage appliances 110, etc. can, of course, be used. The storage appliances 110 are interconnected to the storage devices 104 and 106 via a storage network 112. Fibre Channel or other technology can be used to implement the storage network 112, as is well known in the art. Internet SCSI (iSCSI) or other network technology can be used to communicate between the clients 100 and 102 and the storage appliances 110, as is well known in the art.

Data Collection

Figure 2:
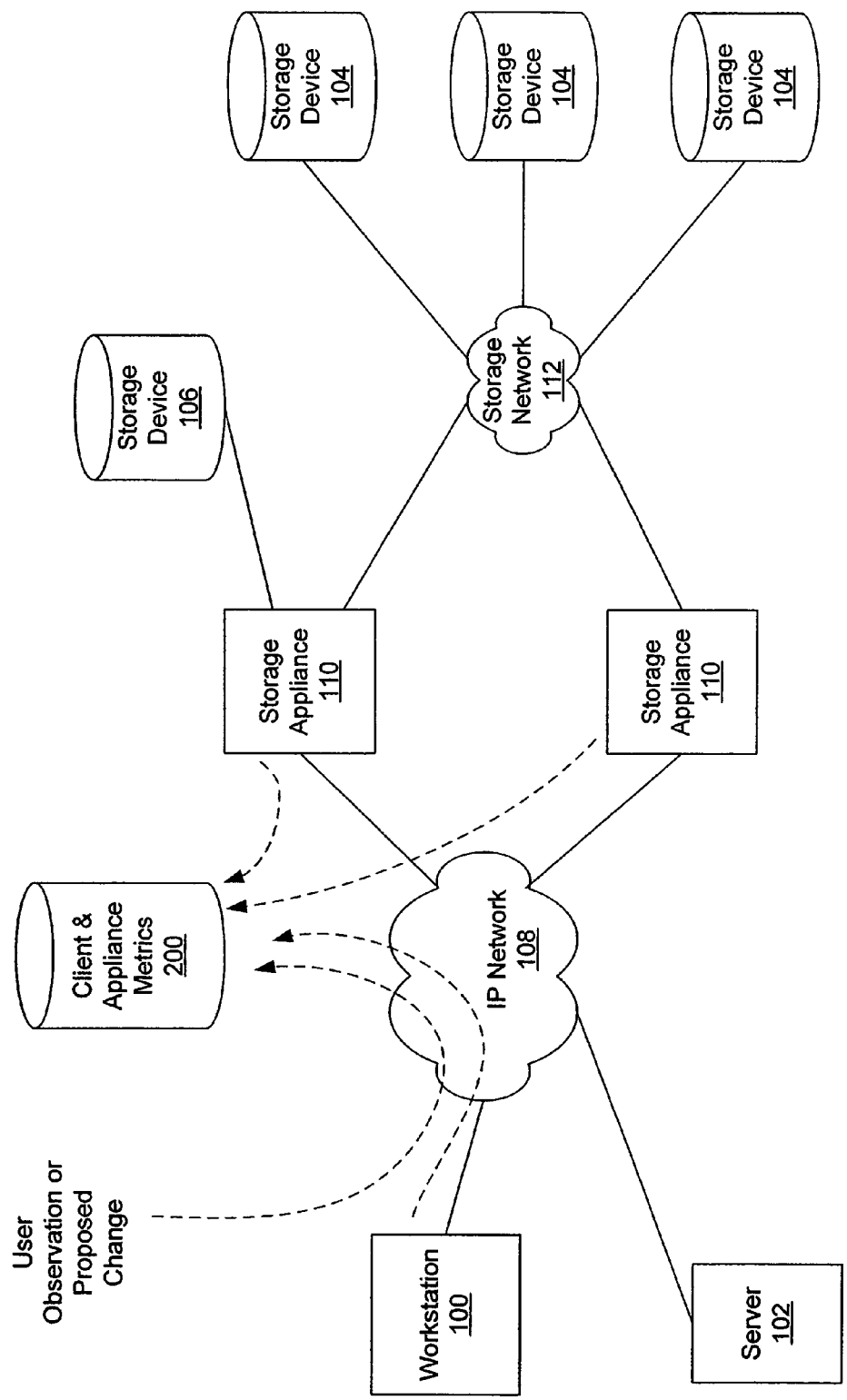
FIG. 2 is a block diagram depicting data flow during metric collection, according to one embodiment of the present invention.

As shown in FIG. 2, metrics are collected from one or more of the storage appliances 110 (and optionally from the clients 100 and 102) and stored in a memory 200. Optionally, inputs from users concerning the users' perceptions of the performance of one or more components of the network storage system are also collected and stored in the memory 200. As noted, "user" herein can mean a user of the workstation 100, an administrator of the server 102 or one or more of the storage appliances 110 or anther human who interacts with the system or a component thereof. Optionally, additional metrics are collected from components (such as switches or routers) in the storage network 112, from components (such as switches or routers) in the IP network 108 and/or from the storage devices 104-106 and stored in the memory 200.

The metrics can be collected by a data collector in the form of a program executing on one or more processors in one or more of the storage appliances 110. Alternatively, the data collector can be located in the workstation 100, the server 102 or another processor (not shown) or a combination thereof. In one example, the data collector operates autonomously to collect the metrics at regular intervals. In another example, the data collector starts operating in response to a user command, and the data collector collects the metrics at regular intervals for a user-specified amount of time or until a subsequent user command stops the data collection. In yet another example, the data collector collects at least some of the metrics only when one or more of the storage appliances 110 and/or storage devices 104-106 are busy, i.e., when a predetermined metric exceeds a predetermined threshold.

The data collector can query operating system software and other software or hardware on the storage appliances 110, the clients 100-102 and other components of the network storage system to collect the metrics. For example, the data collector uses application programming interfaces (APIs) provided by the software. In addition, the data collector can retrieve metrics by reading fields within data structures, measuring queue lengths, reading clocks or other registers, etc. in the software or hardware of the storage appliances 110, the clients 100-102 or other components of the network storage system. Alternatively or in addition, the data collector can execute scripts, which issue commands (such as the Unix® command "sysstat," "vol status," "statit," "df," "netstat" and/ or "ifstat"), and the data collector can collect responses from these commands.

The data collector collects metrics that include resource utilization and configuration information. Resource utilization includes metrics such as central processing unit (CPU) utilization, input/output (I/O) rates and free space remaining on disks. Configuration information includes metrics such as operating system version number, memory size, CPU speed, numbers of CPUs and disk drive model numbers.

An input from one or more users concerning the users' perceptions of the performance of one or more components of the network storage system can also be collected. For example, a user employs a utility program executing on a client 100-102 or on the server 102 or on one of the storage appliances 110 to select one of a predetermined list of indications of user-perceived performance, and the utility program stores the selected indication in the memory 200. The inputted indication becomes part of the operating metrics stored in the memory 200. Table 1 is an exemplary list of user-perceived performance indications.

TABLE 1

Exemplary User-Perceived Performance Indications

Slow response
High CPU utilization
Network problem
Server not responding
Low throughput
No specific complaint Optionally, a user can employ a utility program executing on the client 100-102 or on the server 102 or on one of the storage appliances 110 to enter a proposed change to the configuration of the network storage system. The inputted change to the configuration becomes part of the operating metrics stored in the memory 200. For example, the user can make an entry that indicates the operating system version number of a particular storage appliance is to be changed. As still be discussed below, this type of metric enables the system to predict performance problems that may arise as a result of the proposed change.

The memory 200 can be a file stored on one of the storage devices 104-106 or on one of the clients 100-102. Metrics stored in such a file can be analyzed by executing an analysis tool (described below) on a processor, such as on the workstation 100, the server 102, one of the storage appliances 110 or another processor (not shown). Alternatively, the metrics can be copied to a file on another system for analysis, as discussed in more detail below. This other system can be located within the network storage system shown in FIGS. 1 and 2 or elsewhere.

Alternatively, the memory 200 can be a memory within one of the storage appliances 110, the workstation 100 or the server 102. For example, the memory 200 can be random access memory (RAM) within one of the computers 110, 100 or 102. In one embodiment, the data collector stores collected metrics in RAM and occasionally or periodically, such as hourly, copies the collected metrics from RAM to a file.

Figure 3:
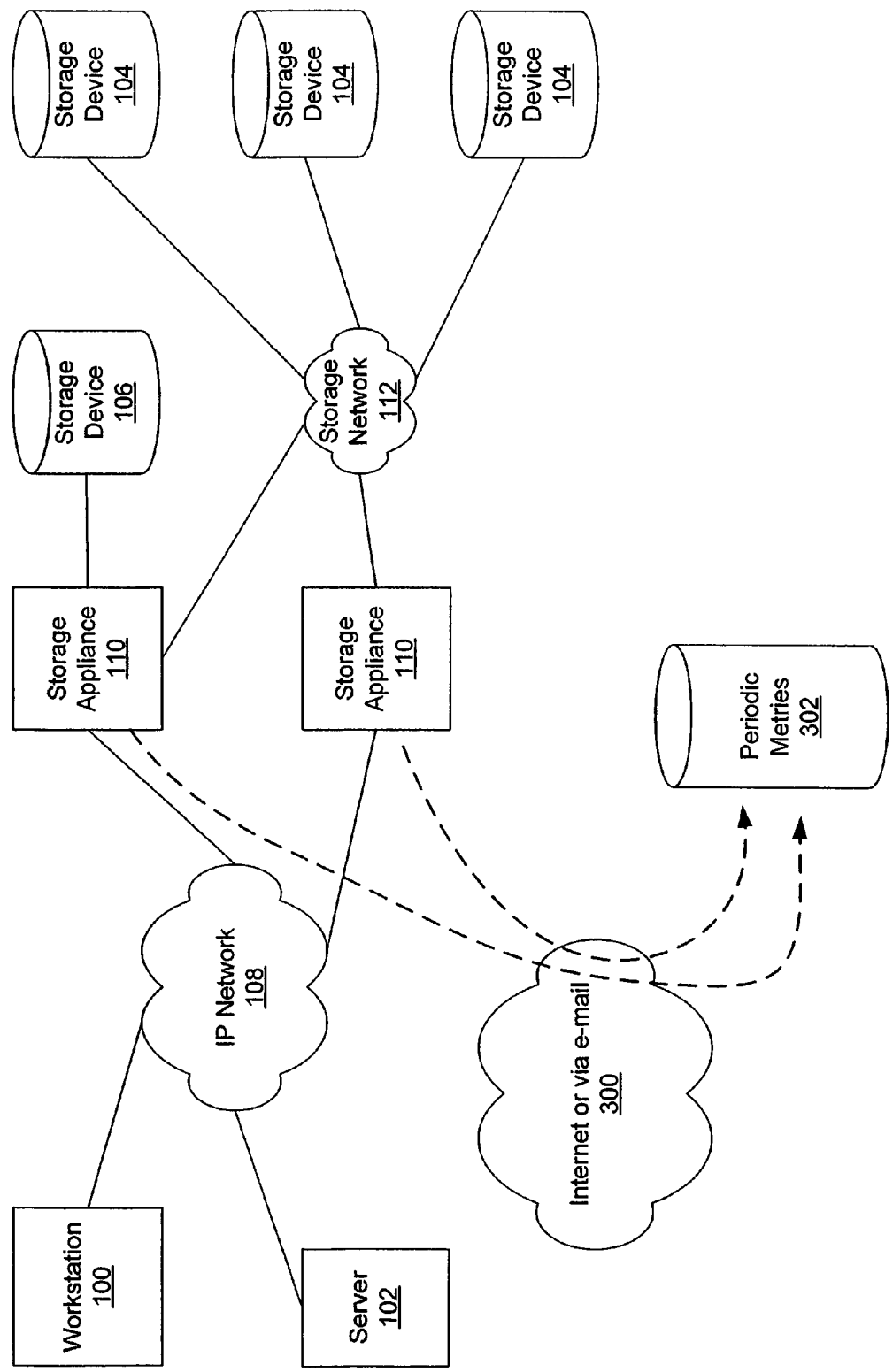
FIG. 3 is a block diagram depicting data flow, according to another embodiment of the present invention.

In either case, as shown in FIG. 3, the metrics can be automatically periodically or occasionally sent to another location for storage and/or analysis. For example, the metrics can be sent weekly via e-mail or another transport mechanism over the Internet 300 for storage in another memory 302, such as a disk file at a vendor's site, at a service bureau or at some other central location. In one disclosed system, one or more storage appliances 110 reside in each of several customer sites. Periodically or occasionally, the data collector in the respective storage appliance(s) 110 at the various customer sites sends a file containing the metrics to the vendor's site. The data collector uses the File Transfer Protocol (FTP) to send the file to an FTP server (not shown) at the vendor's site. Alternatively, any other suitable protocol and/or data transfer mechanism can be used to send the file. Alternatively, the data can be sent in real-time or near real-time as a stream of packets. Thus, the vendor can detect and/or diagnose performance issues in a customer's storage network remotely, i.e. without necessarily sending a technician to the customer's site. Optionally, a tailored, customer-specific set of rules (data analysis is discussed in more detail below) can be used to analyze the metrics received from the data collector in each customer site.

In one embodiment, the data collector collects metrics at regular intervals and stores the collected metrics in the memory 200. In another embodiment, the data collector stores certain metrics only if these or other metrics exceed predetermined thresholds, thereby reducing the amount of data stored during periods of little or no storage appliance activity. For example, when the CPU utilization on a storage appliance exceeds a predetermined threshold, such as 90%, the data collector collects metrics until either a predetermined amount of time, such as five minutes, has passed or the CPU utilization falls below the same or another predetermined threshold, such as 10%, whichever occurs later.

Other metrics and thresholds, instead of or in addition to CPU utilization, can be used to trigger such activity-based data collection. Examples of such other metrics and thresholds include: the rate of I/O operations involving a particular storage device 104-106 (with a threshold of, for example, 70% of the maximum I/O rate sustainable by the particular storage device or model involved); the aggregate rate of I/O operations involving all storage devices connected to a particular storage appliance (with a threshold of the number of storage devices multiplied by, for example, 120 I/O operations per second); the rate at which data is transferred to and from a particular storage device (with a threshold of, for example, 70% of the maximum data rate sustainable by the storage device or model involved); the aggregate rate at which data is transferred to and from all storage devices connected to a particular storage appliance; and the rate at which data is transferred over a network interface between the storage appliance 110 and the IP network 108 or between the storage appliance and the storage network 112 (with a threshold of, for example, 80% of the maximum data rate sustainable by the storage network).

Data collection can be triggered by a logical combination, such as AND or OR, of metrics. For example, data collection can be triggered if the CPU utilization is greater than 10% AND the I/O rate to any storage device exceeds 70 I/O operations per second.

Threshold values, rules-of-thumb and other values are presented herein as exemplary, non-limiting values. Those of ordinary skill in the art will recognize that other values can be used. For example, some values can be scaled (up or down) in relation to the speed of a processor and/or the speed of a disk drive. Some values can be scaled in relation to the storage capacity of a disk drive. Some values can be adjusted up or down, depending on a maximum utilization selected for a resource. For example, Operations Analysis principles correlate utilization, service time and queue length. Thus, if a higher utilization is acceptable (for example, if it is acceptable for a disk drive to be up to 85% busy, rather than up to 70% busy), then a correspondingly longer queue length is acceptable.

Data Analysis

Figure 4:
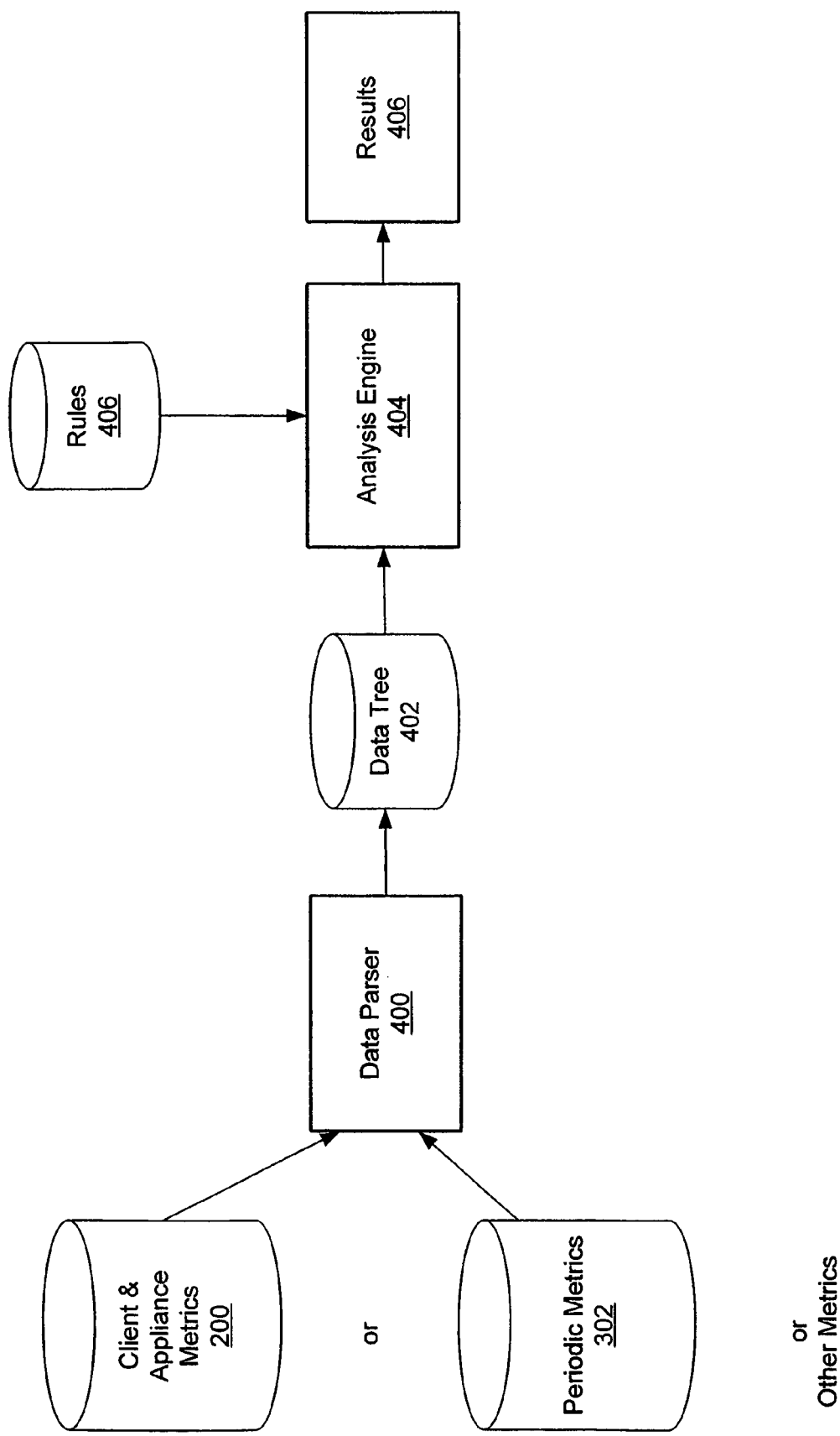
FIG. 4 is a block diagram depicting primary components involved in analyzing collected metrics, according to one embodiment of the present invention.

Once metrics have been collected, and optionally transferred to a central location, the metrics can be analyzed. FIG. 4 illustrates components and operations involved in analyzing the collected metrics. Metrics 200 collected and stored in the network storage system or metrics 302 that have been transferred to a central location or other metrics are read by a data parser 400. The data parser 400 sorts the metrics and stores the sorted metrics in a data tree 402. The data tree 402 forms a hierarchy of nodes, in which each node represents a performance aspect of the network storage system. In one embodiment, the top-level nodes of the hierarchy represent individual storage appliances 110. Each second-level node represents a group or category of related performance metrics. Table 2 contains an exemplary list of second-level of nodes (categories). These categories are described in more detail below, with reference to a hierarchical display of performance metrics.

TABLE 2

Exemplary Performance Metric Categories

Figure 5:
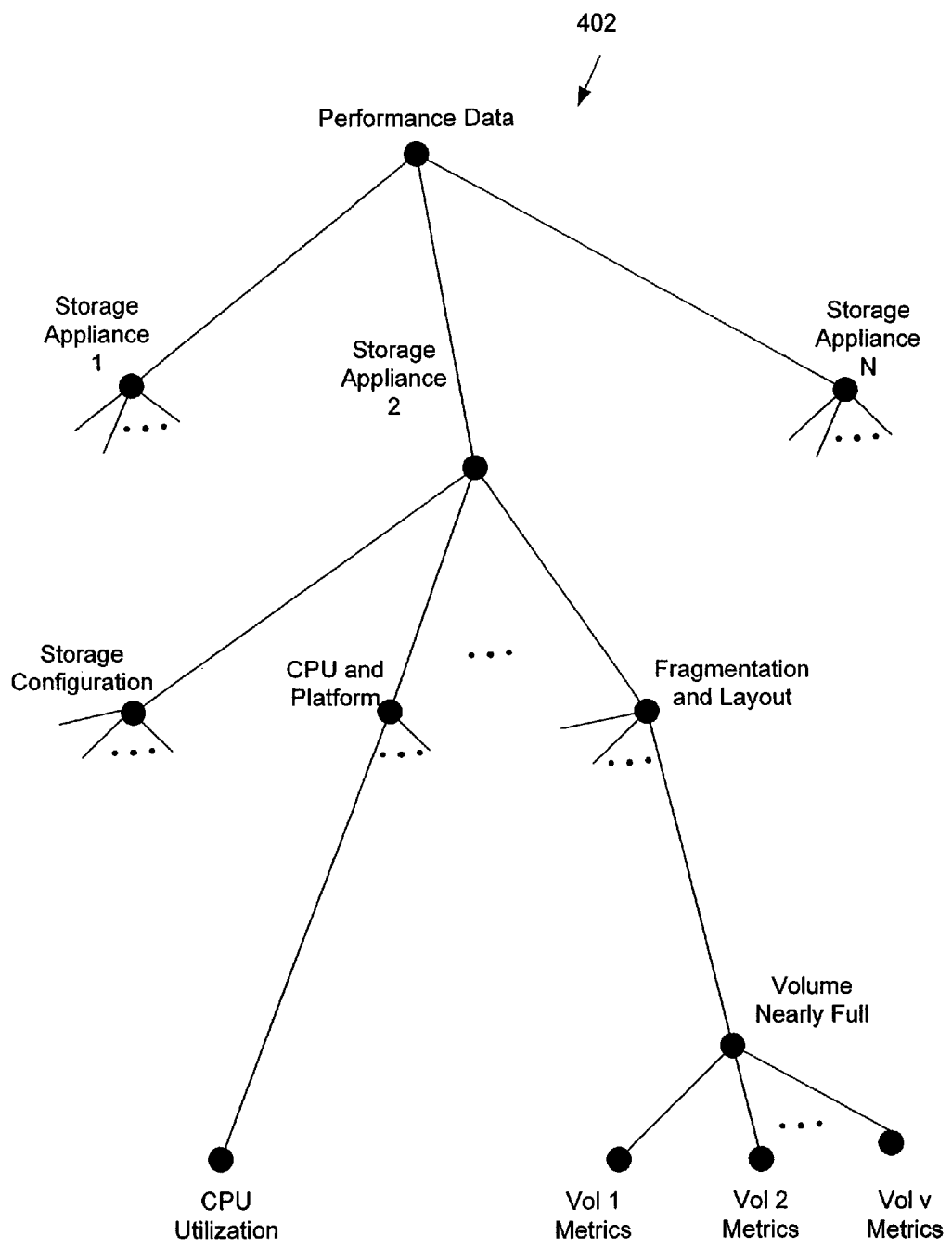
FIG. 5 is an exemplary data tree, according to one embodiment of the present invention.

Storage configuration
Network File System (NFS) and Common Internet File System (CIFS)
CPU and platform
SAN and iSAN
Volume mirroring
Network
Fragmentation and layout Each third-level node represents an individual metric. Some examples of these metrics were discussed above (such as CPU utilization and numbers of I/O operations per second). Additional examples of these metrics are provided below. Optionally, some or all of the third-level nodes have fourth-level nodes. For example, if a node represents a network interface that includes more than one port, each port can have a respective fourth-level node. An example of a data tree 402 is shown in FIG. 5.

Figure 6:
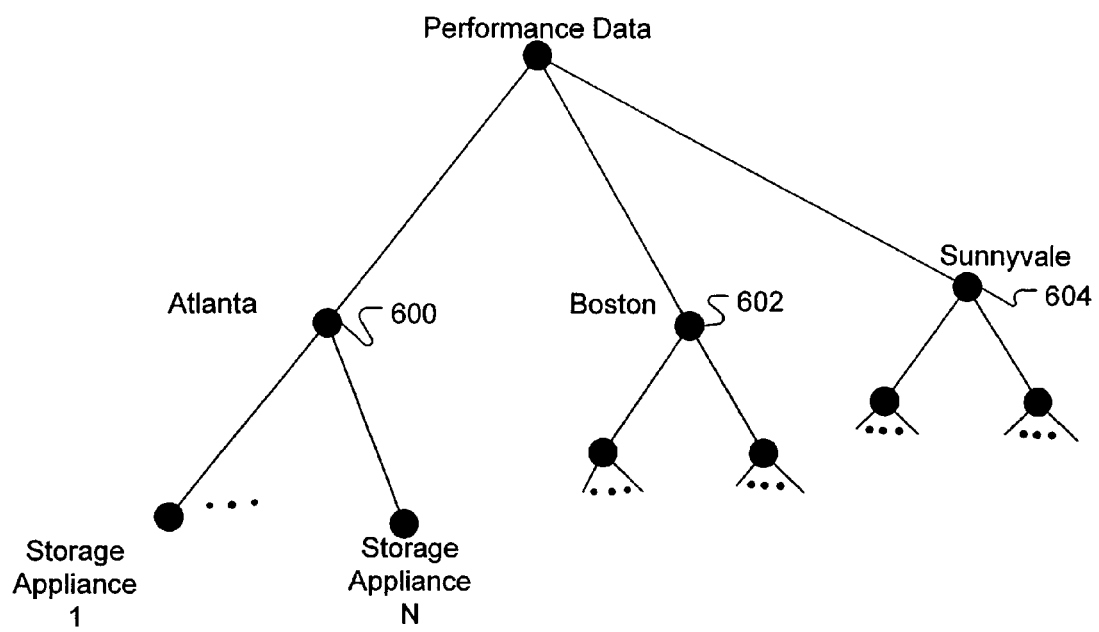
FIG. 6 is in an exemplary data tree, according to another embodiment of the present invention.

Optionally, multiple instances of the above-described hierarchy can descend from a single node of a higher-level hierarchy. For example, the higher-level hierarchy can include a "group" node for each of several groups of storage appliances 110, geographically dispersed data centers or other automatically-generated or user-selected logical groups of storage appliances. An exemplary portion of such a hierarchy is shown in FIG. 6. In the example shown in FIG. 6, an instance of the above-described hierarchy descends from each group node 600, 602 and 604. As will be seen below, with reference to the hierarchical display of performance metrics, such a higher-level hierarchy enables a user (such as a system administrator) to view results from a large number of storage appliances.

Returning to FIG. 4, an analysis engine 404 reads the data tree 402 and a set of rules (a rule base) 406. The analysis engine applies the rule base to the operating metrics in the data tree 402. Each rule is associated with one or more of the metrics in the data tree 402. Some metrics can be used by multiple rules. For each associated metric, the rule specifies a value (threshold) and a relationship (such as "is less than," "equals" or "exceeds") to the threshold. The metric, threshold and relationship is referred to herein as a metric/threshold/relationship-tuple. If a measured metric has the specified relationship to the threshold, the metric is referred to as being "equivalent" to the threshold, and the rule is triggered (i.e., the rule "fires"). For example, if the metric is CPU utilization, the threshold is 70% and the relationship is "exceeds," and the measured CPU utilization exceeds 70%, the rule is triggered.

A rule can identify more than one metric/threshold/relationship-tuple. In this case, the rule specifies a logical relationship, such as AND or OR, among the tuples of the rule. For example, if the CPU utilization exceeds 70% AND the number of I/O operations per second to a particular disk exceeds 100, the rule is triggered. A rule can combine metric/threshold/relationship-tuples that involve more than one storage appliance or a combination of storage appliance(s), client(s) and/or other components of the network storage system. Thus, a rule can be designed to trigger as a result of interactions between components of the network storage system.

As noted, the metrics can include an indication of user-perceived performance of one more components of the network storage system. A rule can include a threshold related to this user-perceived performance and a corresponding relationship. For example, if the user-perceived performance indication equals "Slow response" AND the CPU utilization exceeds 70%, the rule is triggered. Some rules can include a combination of user-perceived performance thresholds. For example, if the user-perceived performance indication equals "Slow response" OR "Server not responding" (possibly in combination with other metrics and thresholds), the rule is triggered.

Each rule has an associated recommended action. If a rule is triggered, the system outputs the recommended action. For example, if the CPU utilization exceeds 70%, the system can recommend upgrading to a faster processor or distributing the processor load among several less heavily loaded processors.

In addition to, or instead of, comparing a metric to a threshold, a rule can calculate a rate of change of a metric and compare that rate to a threshold. The rate of change can be calculated from two or more samples of the metric taken at spaced-apart times. This enables the rule to detect that a resource is becoming saturated or exhausted, before the resource actually reaches saturation or exhaustion. Thus, the system can make a recommendation in advance of the resource reaching a critical state. For example, if the CPU utilization exceeds 70% AND the CPU utilization is increasing at a rate greater than 5% per month, the system can recommend upgrading to a faster processor or distributing the processor load.

If particular versions of the software being executed by the storage appliances 110 or other components of the network storage system or particular features or combinations of features of the software are known to be associated with performance issues, the system can include rules specifically written for these issues. For example, if a particular version of the software or a particular software feature is known to place a heavier load on the processor of a storage appliance than previous versions of the software or software operated with the feature disabled, and the metrics indicate a proposed upgrade to that version of the software or enabling the feature, the rule can trigger and recommend upgrading to a faster processor before upgrading the software or enabling the feature. Alternatively, the rule can recommend against upgrading to that version of the software or against enabling the feature.

For example, in some network storage systems, software executed by a storage appliance 110 can aggregate storage space available on a plurality of storage devices 104. The software can then present one or more logical volumes to the clients 100-102 and implement the logical volumes in the aggregated storage space. That is, the software accepts I/O commands that are directed by the clients 100-102 to the logical volumes, and the software performs I/O operations on the aggregated storage devices 104 to store or retrieve data specified by the I/O commands from the clients. Such software is available, for example, from Network Appliance, Inc. of Sunnyvale, Calif. under the trade name FlexVol. If such software is not used on all network storage systems, and experience has shown that the software places a heavy load on the processor of the storage appliance 110, a rule can be triggered by an indication in the metrics that this software is planned to be used, in combination with a measured CPU utilization that could not sustain the additional load of this software.

For each rule that is triggered, the analysis engine 404 calculates a "confidence level" that can be used to indicate whether the rule has detected a true problem or that the recommended action will solve or alleviate the problem. This confidence level can also be used to prioritize recommendations provided by more than one rule. Thus, a confidence level is sometimes referred to as a "priority." For example, metrics collected from a memory-constrained storage appliance are likely to trigger more than one rule, each with its own (possibly different) recommended action. The priority of each triggered rule can be used by a system administrator to decide which recommended action(s) to take and, possibly, in which order to take the actions. For example, the action recommended by the highest priority rule that is triggered may alleviate the problem. If not, the combined results from the actions recommended by the two or three highest priority rules may alleviate the problem, and so forth. For simplicity, the confidence level is hereinafter referred to as a priority level.

The analysis engine 404 can calculate the priority level in various ways. In one embodiment, the analysis engine 404 selects one of four possible priority levels: "No problem found," "Low priority problem found," "Medium priority problem found" and "High priority problem found." In one implementation, three progressively larger (or progressively smaller, depending on the type of metric) values for each threshold are provided. Each of these values is associated with one of the three higher-level priorities. Thus, if a rule is triggered using the highest (lowest) of the three thresholds, the priority level is deemed to be "High." If the rule is not triggered using the highest (lowest) of the three thresholds, but the rule is triggered using the second-highest (second-lowest) of the three thresholds, the priority level is deemed to be "Medium." If the rule is triggered using only the lowest (highest) of the three thresholds, the priority is deemed to be "Low." If the rule is not triggered using any of the three thresholds, the rule is not triggered and the priority level is deemed to be "No problem found."

In another implementation, a single threshold is specified for each metric/threshold/relationship-tuple, and two additional thresholds are automatically calculated from the specified threshold. For example, the first calculated metric can be calculated by multiplying the specified metric by 110% (90%), and the second calculated metric can be calculated by multiplying the specified metric by 125% (75%). The specified metric and the two calculated metrics are used as described above in the three-metric implementation.

In another implementation, if a rule is triggered, additional metrics, thresholds and relationships are used to determine the rule's priority. In yet another implementation, each rule has a single associated priority. Although four possible priority values are described, other numbers of priority values can be used. Alternatively, a numerical value can be calculated for the priority level, such as by applying an appropriate mathematical function to some or all of the metrics of the rule. For example, the priority level can be calculated as a sum of the metrics of the rule, each multiplied by a respective weight.

For each triggered rule, the analysis engine 404 displays a result 406, such as by way of a graphical user interface (GUI) on a workstation. Optionally, the results can be stored in a file (not shown) for later viewing.

Results Display

Each triggered rule produces an output that includes an indication of the priority of the rule, a suggested action to alleviate or avoid the problem that caused the rule to be triggered and an optional explanation of the rule. The results are displayed hierarchically.

Figure 7:
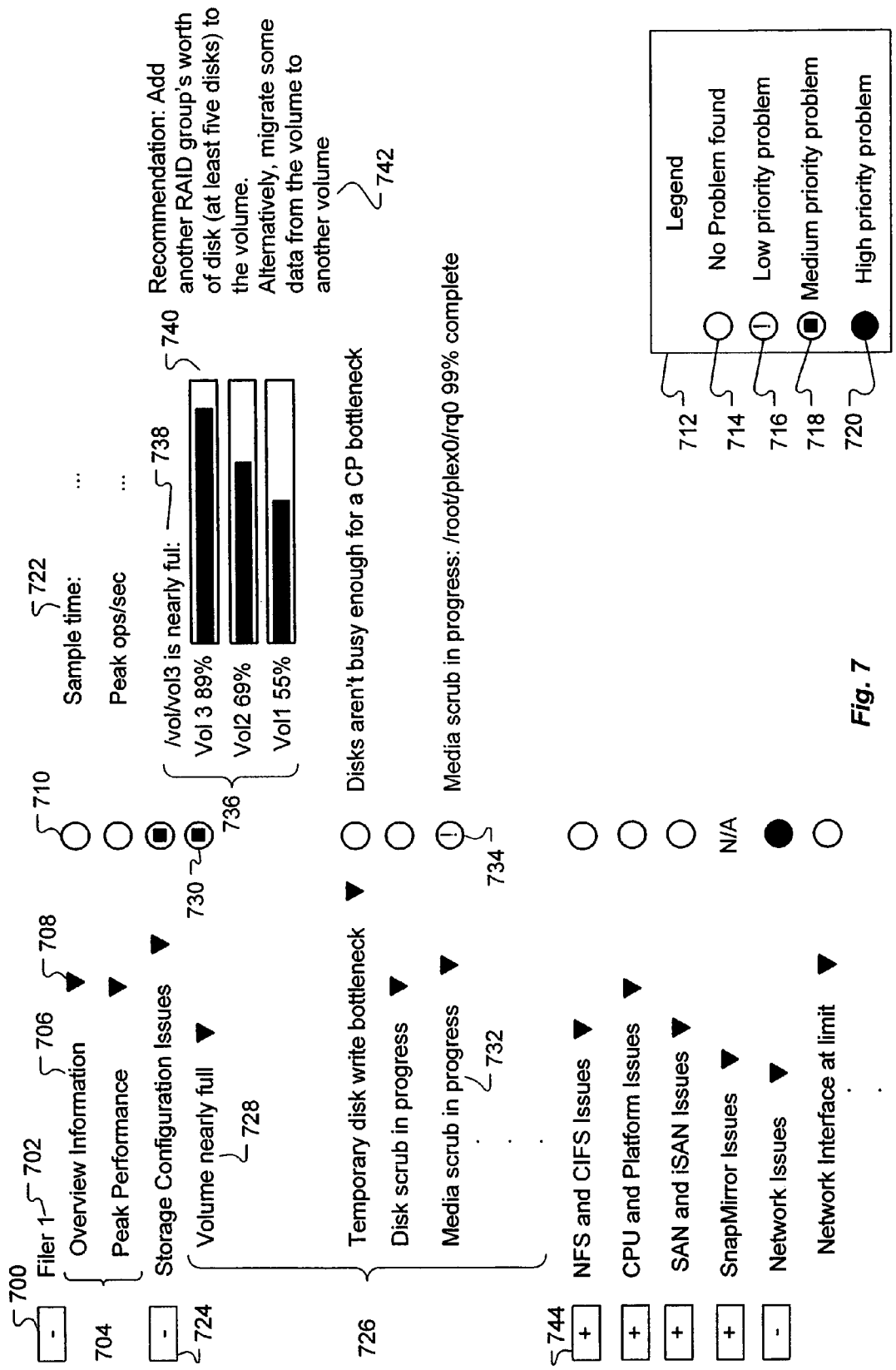
FIG. 7 is a portion of an exemplary display produced by an embodiment of the present invention.

FIG. 7 shows a portion of an exemplary display produced by the analysis engine 404. As noted, each top-level node of the hierarchy (i.e., of the data tree 402) represents a storage appliance. Each of these top-level nodes is represented by an icon 700. In the example of FIG. 7, only one top-level node is visible, but other top-level nodes can be made visible by viewing other portions of the display, such as by scrolling the display.

The icon is displayed as either a plus sign (+) or a minus sign (−), depending on whether additional information or the next level of the hierarchy is displayed below the top-level node or, alternatively, the additional information or the next level of the hierarchy is hidden. If a user invokes the icon 700, such as by clicking on the icon, the icon switches its state, i.e., between (+) and (−), and the next level of the hierarchy is displayed or hidden. Clicking on a plus (+) icon to display a next level of the hierarchy is referred to as "expanding," and clicking on a minus (−) icon to hide a next level of the hierarchy is referred to as "collapsing" the hierarchy. Other, lower-level, nodes of the display exhibit similar behavior.

Next to the top-level node's icon 700, the system displays a name 702 of the corresponding storage appliance. If the icon 700 is a minus sign (−), information 704 about the storage appliance is displayed below, and indented toward the right of, the icon 700. Each line of the information 704 is referred to as a node and represents a rule or group of related rules. Each node 704 includes a descriptive name 706 and a "pull-down" icon 708. If the user clicks on the pull-down icon 708, the system displays additional information about the rule, such as an explanation of the metrics and thresholds involved, an explanation of the performance problem detected by the rule, etc. Clicking on the pull-down icon 708 again cause the system to hide the additional information.

Each node 704 also includes a priority icon 710 that indicates if the rule has been triggered and the priority of the rule. A legend 712 shows the possible values of the priority icon 710. For example, an open circle 714 represents "No problem found," i.e., a rule that was not triggered. Other possible values 716, 718 and 720 for the priority icon 710 represent progressively higher confidence levels that the rule has detected a true problem or that the recommended action (discussed below) will alleviate or avoid the problem. Although three possible values 716-720 for the priority icon 710 are shown, other numbers of possible values and other shapes for the priority icon are possible.

Each node of the display that represents more than one rule includes a priority icon that indicates the priority of the highest priority triggered rule within that node's sub-hierarchy. For example, icon 724 represents a category of performance metrics. (See Table 2, above.) This category includes configuration issues related to the storage appliance represented by the icon 700 and the disks and volumes being handled by the storage appliance. This category includes several rules or groups of rules 726, each of which is a node and is represented by a line of the display. Each line 726 is indented to the right of its category icon 724.

Some of the rules represented by the nodes 726 were triggered. For example, the rule "Volume nearly full" 728 was triggered and now indicates a medium priority problem via its icon 730. Similarly, the rule "Media scrub in progress" 732 was triggered and now indicates a low priority problem via its icon 734. The median priority problem indicated by icon 730 is of a higher priority than the low priority problem indicated by icon 734. Thus, the "Storage configuration issues" node 724 of the display indicates a medium priority problem via its icon 736 (assuming no rule within the lines 726 was triggered with a yet higher priority).

Next to the priority icon 710, each line of information 704 and 726 includes a brief explanation (such as indicated at 722) of why the rule was triggered or not triggered. For example, this explanation can include a summary or subset of the metrics and/or thresholds used by the rule. As shown at 736, this explanation can be textual, numerical, graphical or a combination thereof. For example, rule 728 indicates that a volume is nearly full. Text 738 indicates which volume (/vol/vol3) is nearly full. In addition, the utilization of vol3 is shown at 740 to be 89%.

For each triggered rule, to the right of the brief explanation of the rule, the system displays a recommended action. For example, rule 728 suggests adding disks to the volume that is nearly full (as indicated at 742).

As noted, a user (such as a system administrator) can selectively expand or collapse portions of the displayed hierarchy. Thus, the display is referred to as an expandable/collapsible hierarchy. Each category node, such as nodes 724 and 744, represents a plurality of related rules. Each top-level node, such as node 700, represents a storage appliance and all the rules of all the categories related to the storage appliance. Thus, the hierarchy comprises nodes, each node corresponding to a plurality of related rules.

The data parser 400 and the analysis engine 404 can be stand-alone programs, or either or both of these programs can be part of a larger system management facility. For example, a comprehensive system management facility for a storage network includes a server (not shown) that monitors storage appliances 110, storage devices 104-106, network elements (such as switches and routers) in the storage network 112 and, optionally, other components. The system management facility displays information about the monitored components and allows a user (such as a system administrator) to control the components. For example, through interactive displays, the system management facility allows the user to add or remove disk drives to or from a RAID group. Such a system management facility is available from Network Appliance, Inc. of Sunnyvale, Calif. under the tradename DataFabric™ Manager. The data parser 400 and/or the analysis engine 404 can be included in the server (or one of the servers) of the system management facility, and the results 406 can be displayed as part of the display(s) provided by the system management facility.

Exemplary Rules

Several exemplary rules were discussed above. Additional exemplary rules are now provided for the exemplary performance metric categories described above.

1. Storage Configuration 1.1. Volume nearly full: If a volume is more than 80% full, and the user-perceived performance indicator is "Slow response," this rule suggests adding another RAID group's worth of disks (at least five disks) to the volume or, alternatively, migrating some data from the volume to another volume. ("RAID" here and elsewhere can mean RAID-4, RAID-5, RAID-DP™ (a proprietary RAID available from Network Appliance, Inc. of Sunnyvale, Calif.) or another appropriate type of redundant storage scheme.)

1.2. Disk reconstruction in progress: Some network storage systems transparently store data in Redundant Arrays of Inexpensive (or Independent) disks (RAID), in case of a catastrophic failure of one of the disks. When a disk is added to an existing RAID group, such as after such a catastrophic failure, software executing on a storage appliance writes data on the added disk, so the disk can participate in the RAID group. This operation is commonly referred to as "reconstruction." During reconstruction, the disk is typically very busy. In addition, during reconstruction, the CPU utilization of the storage appliance is typically higher than normal. If disk reconstruction is in progress, and the user-perceived performance indicator is "Slow response," this rule suggests adjusting RAID reconstruction parameters (such as reducing the rate at which the disk is reconstructed) or, alternatively, waiting until the reconstruction completes and conducting the performance analysis again.

1.3. Fibre Channel (FC) loop limit: As noted with respect to FIG. 1, the storage network 112 that interconnects the storage appliances 110 in the storage devices 104 often includes Fibre Channel components. In some cases, the storage appliance 110 is connected to the storage devices 104 over a Fibre Channel loop. If any Fibre Channel loop carries more than 90 MB per second of traffic, and the user-perceived performance indicator is "Slow response," this rule suggests spreading the traffic among additional Fibre Channel loops.

2. NFS and CIFS 2.1. NFS over UDP: Some clients 100-102 communicate over the IP network 108 with the storage appliances 110 using the Network File System (NFS) protocol. The NFS protocol performs better when transported over the Transmission Control Protocol (TCP) than when it is transported over the User Datagram Protocol (UDP). If NFS is carried over UDP, and the user-perceived performance indicator is "Slow response," this rule suggests reconfiguring NFS to be carried over TCP.

2.2. NFS version 2: NFS version 3 often performs better than NFS version 2. If the NFS version equals 2, and the user-perceived performance indicator is "Slow response," this rule suggests upgrading to NFS version 3.

2.3. NFS transfer size: If NFS transfers are never larger than a predetermined size, such as 16 KB, and the user-perceived performance indicator is "Slow response," this rule suggests adjusting volume mount parameters to force larger transfers. For example, for NFS version 3 or version 4 transported over TCP, read and write sizes should be larger than 8,192 bytes.

2.4. NFS UDP transfer size: If NFS transfers over UDP are larger than a predetermined size, such as 8 KB, and the user-perceived performance indicator is "Low throughput," this rule suggests adjusting volume mount parameters to force smaller transfers, such as less than 8,192 bytes.

3. CPU and Platform 3.1. Domain bottleneck on multiprocessor: In a multiprocessing system, the operating system is typically divided into a number of "domains," such as network, storage and RAID. A processor of a multiprocessing system generally operates within only one domain at a time. The processor can access data related to the domain in which the processor is operating without synchronizing with another domain. However, before the processor can access data of another domain, the processor must synchronize access to the data, i.e., the processor must obtain ownership of a lock that controls access to the data. If a multiprocessor system spends more than 85% of its busy time in any one domain, and the user-perceived performance indicator is "Slow response," this rule suggests upgrading the filer (if it is within 80% of its limit) or, alternatively, collect data to identify which process(es) in the domain is(are) consuming a large portion of the processor resources.

4. SAN and iSAN 4.1. High write response times: The operating system typically maintains a histogram of response times. For example, the operating system can store counts of the number of operations that were satisfied in each of several amounts of time, such as within 1 mSec., between 1 and 2 mSec., between 2 and 3 mSec., between 3 and 4 mSec., and so on. Count the number of SCSI requests that were satisfied in less than a predetermined amount of time, such as 7 mSec. Divide this count by the total number of requests. If the result is greater than 10%, and the user-perceived performance indicator is "Slow response," this rule is triggered.

4.2. Excessive checkpoints from snapshot: To improve I/O performance, some network storage systems cache write data operations. Such a system can report completion to a client before the data is actually written to a storage device. The system periodically flushes its cache, to defend against data loss in case of a system failure. Flushing such a cache is sometimes referred to as a "consistency point" (CP). Sometimes a consistency point must be suspended, because a necessary resource (such as a lock on a data structure) is currently unavailable. If more than 0.10% of SCSI write operations take more than 8 mSec. to complete, and the number of suspended consistency points is greater than 10% of the total number of consistency points, and the user-perceived performance indicator is "Slow response," this rule is triggered.

5. Volume Mirroring 5.1. Mirror geometry mismatch: As noted, a volume is implemented across a set of physical disks. Some network storage systems transparently maintain "mirror" copies of volumes. When a client writes data to one volume of a mirror set, software in the network storage system automatically writes a copy of the data to the other members ("side(s)") of the mirror set. If the size of any physical disk that makes up part of one mirror side is more than twice the size of any physical disk that makes up another mirror side, or the number of disks that make up one mirror side is more than twice the number of disks that make up another mirror side, and the disks are more than 75% utilized, and the user-perceived performance indicator is "Low throughput," this rule suggests reconfiguring the mirror to use similar numbers and sizes of disks for each mirror side.

5.2. Mirror with full root volume: Mirroring typically requires writing registry and log data on a root volume. If the amount of free space remaining on the root volume is less than 512 MB, and the user-perceived performance indicator is "Low throughput," this rule suggests making more free space available on the root volume.

6. Network 6.1. Network interface limit: If any network interface card (NIC) is carrying more than 80% of its capacity, and the user-perceived performance indicator is "Network problem," this rule suggests installing additional NICs or redistributing the network load. Gigabit NICs are assumed to have a maximum capacity of 100 MB per second, and 100base-T NICs are assumed to have a maximum capacity of 8 MB per second.

7. Fragmentation and Layout 7.1. Too many consistency point reads: If the total number of checkpoint reads is greater than or equal to 50% of the total number of disk writes, and the user-perceived performance indicator is "Slow response," this rule suggests restructuring the volume, such as by copying its contents to another volume.

The storage appliances 110 (FIGS. 1-3) include host bus adapters or other network or fabric interfaces. In some embodiments, these interfaces convert (translate) messages (packets, etc.) received over the IP network 108 or over the Internet (not shown) according to a variety of protocols into messages according to a common message format for processing by an operating system or other control software. The interfaces also convert messages from the operating system according to the common message format into messages according to the appropriate protocol for transmission over the IP network 108 or the Internet. An exemplary operating system is Data ONTAP™, available from Network Appliance, Inc. of Sunnyvale, Calif. However, any suitable operating system that is capable of receiving and translating data from multiple protocols is acceptable.

The interfaces and the storage device 106 (if present) are controlled by CPUs executing the operating system, control software or other instructions stored in a memory to perform at least some of the functions described herein.

The clients 100-102 and other clients may be general-purpose computers configured to execute applications under the control of a variety of operating systems, including the UNIX® and Microsoft® Windows® operating systems. These computers may utilize file-based or block-based access protocols when accessing information in a storage system over a Network Attached Storage (NAS-based) or Storage Area Network (SAN-based) network, respectively. Therefore, each computer may request the services of the storage system by issuing access protocol messages (in the form of packets) to the storage system over the network. For example, a computer running the Windows operating system may communicate with the storage system using the Common Internet File System (CIFS) protocol over TCP/IP. On the other hand, a computer running the UNIX operating system may communicate with the storage system using the Network File System (NFS) protocol over TCP/IP. It will be apparent to those skilled in the art that other computers running other types of operating systems may also communicate with the storage system, also known as a multi-protocol storage appliance, using other file access protocols. As noted, messages received by the storage system according to various protocols from various clients are translated for execution by an operating system of the storage system.

A performance analysis tool has been described as comprising computer instructions that can be stored in a memory and executed by a processor. Those skilled in the art should readily appreciate that instructions or programs defining the functions of the present invention can be delivered to a processor in many forms, including, but not limited to, information permanently stored on non-writable storage media (e.g. read only memory devices within a computer such as ROM or CD-ROM disks readable by a computer I/O attachment), information alterably stored on writable storage media (e.g. floppy disks and hard drives) or information conveyed to a computer through communication media. In addition, while the invention may be embodied in software, the functions necessary to implement the invention may alternatively be embodied in part or in whole using software, firmware and/or hardware components, such as combinatorial logic, application-specific integrated circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method for analyzing performance of a storage system that includes a client computer connected via a network to a storage appliance, the method comprising:
    collecting, by the client computer, operating metrics from the storage appliance, wherein the operating metrics include transfer sizes between the client computer and the storage appliance;
    receiving an indication of interactively observed user-perceived performance that least a portion of the storage system is responding slowly;
    applying a rule base to the indication and the operating metrics, wherein applying the rule base includes determining that the transfer sizes do not exceed a predetermined threshold; and
    displaying a recommended action including a proposal to adjust volume mount parameters to increase transfer sizes based upon said indication and determination.

2. The method of claim 1, wherein applying the rule base comprises:
    for each of at least some of the rules:
    comparing a first predetermined value associated with the rule to one of the operating metrics;
    comparing a second predetermined value associated with the rule to the indication of interactively observed user-perceived performance; and
    triggering the rule only if the indication of interactively observed user-perceived performance is equivalent to the second predetermined value.

3. The method of claim 1, wherein applying the rule base comprises:
    for each of at least some of the rules:
    calculating a rate of change of one of the operating metrics;
    comparing a predetermined value associated with the rule to the calculated rate of change; and
    triggering the rule only if the calculated rate of change is equivalent to the predetermined value.

4. The method of claim 1, further comprising:
    collecting second operating metrics from the client; and
    wherein applying the rule base comprises applying the rule base to the second operating metrics.

5. The method of claim 1, further comprising:
    collecting second operating metrics from another storage appliance; and
    wherein applying the rule base comprises applying the rule base to the second operating metrics.

6. The method of claim 1, further comprising:
    for at least one triggered rule, determining a priority level associated with the rule and outputting an indication of the priority level with the recommended action that corresponds to the triggered rule.

7. The method of claim 1, further comprising: displaying the recommended action in an expandable/collapsible hierarchy, the hierarchy comprising nodes, each node corresponding to a plurality of related rules.

8. The method of claim 7, wherein displaying the recommended action in an expandable/collapsible hierarchy comprises:
    displaying at least one icon, each icon representing a respective node of the hierarchy;
    in response to a first invocation of one of the at least one icon, displaying information about at least some of the rules that correspond to the represented node; and
    in response to a second invocation of the icon, ceasing to display the information.

9. The method of claim 7, further comprising:
    for at least one triggered rule, determining a priority level associated with the rule; and
    wherein displaying the recommended action in an expandable/collapsible hierarchy comprises, for at least one displayed node of the hierarchy, displaying an indication of the highest priority determined among the plurality of related rules corresponding to the node.

10. The method of claim 1, wherein collecting the operating metrics comprises storing each of the operating metrics in a node of a tree data structure.

11. The method of claim 1, further comprising:
    inputting information about a proposed change to the storage system;
    and wherein applying the rule base comprises:
    for each of at least some of the rules:
    comparing a predetermined value associated with the rule to the information about the proposed change to the storage system; and
    triggering the rule only if the information about the proposed change is equivalent to the predetermined value.

12. The method of claim 1, wherein collecting the operating metrics comprises collecting at least a portion of the operating metrics only if a predetermined operating metric meets a predetermined criterion.

13. The method of claim 1, wherein collecting the operating metrics comprises:
    beginning to collect at least a portion of the operating metrics when a predetermined operating metric meets a predetermined criterion; and ceasing to collect the at least the portion of the operating metrics when the predetermined metric ceases to meet the predetermined criterion.

14. The method of claim 13, further comprising:
inputting information about a proposed change to the storage system; and
wherein applying the rule base comprises:
for each of at least some of the rules:
comparing a predetermined value associated with the rule to the information about the proposed change to the storage system; and
triggering the rule only if the information about the proposed change is equivalent to the predetermined value;
for each of at least some of the rules:
comparing a first predetermined value associated with the rule to one of the operating metrics;
comparing a second predetermined value associated with the rule to the indication of interactively observed user-perceived performance;
triggering the rule only if the indication of interactively observed user-perceived performance is equivalent to the second predetermined value; and
for each of at least some of the rules:
calculating a rate of change of one of the operating metrics;
comparing a third predetermined value associated with the rule to the calculated rate of change; and
triggering the rule only if the calculated rate of change is equivalent to the third predetermined value;
further comprising:
for at least one triggered rule, determining a priority level associated with the rule and outputting an indication of the priority level with the recommended action that corresponds to the triggered rule;
wherein outputting the recommended action comprises displaying the recommended action in an expandable/collapsible hierarchy, the hierarchy comprising nodes, each node corresponding to a plurality of related rules; and
wherein displaying the recommended action in an expandable/collapsible hierarchy comprises, for at least one displayed node of the hierarchy, displaying an indication of the highest priority determined among the plurality of related rules corresponding to the node.

15. The method of claim 1, further comprising:
sending the operating metrics to a remote location before applying the rule base to the operating metrics.

16. The method of claim 15, wherein sending the operating metrics comprising sending an e-mail message to the remote location.

17. The method of claim 15, wherein sending the operating metrics comprising establishing a file transfer session with the remote location.

18. A method for analyzing performance of a storage system that includes a client computer connected via a network to a storage appliance, the method comprising:
collecting, by the client computer, operating metrics from the storage appliance, wherein the operating metrics include transfer sizes between the client computer and the storage appliance, and wherein the collecting includes collecting at least a portion of the operating metrics only if a predetermined operating metric meets a predetermined criterion;
receiving an indication of interactively observed user-perceived performance that least a portion of the storage system is responding slowly;
applying a rule base to the indication and the operating metrics, wherein applying the rule base includes determining that the transfer sizes do not exceed the predetermined criterion; and
displaying a recommended action including a proposal to adjust volume mount parameters to increase transfer sizes based upon said indication and determination.

19. A performance analysis system comprising:
a memory storing computer instructions;
a processor executing the instructions, the instructions causing the processor to be operable to:
read operating metrics collected from a storage appliance and an indication of interactively observed user-perceived performance of at least a portion of a storage system, wherein the operating metrics include transfer sizes between the client computer and the storage appliance and the indication includes an observation that at least a portion of the storage system is responding slowly;
apply a rule base to the operating metrics and the indication of interactively observed user-perceived performance; and
displaying a recommended action including a proposal to adjust volume mount parameters to increase transfer sizes based upon said indication and determination.

20. The performance analysis system of claim 19, wherein the instructions cause the processor to be operable to display information about elements of a storage network and, responsive to an input from a user, control the elements of the storage network.

* * * * *